April 29, 1941.    R. W. PARKER    2,239,687
SHOCK ABSORBER FOR BELT CONVEYER GUIDE AND ACTUATING ROLLS
Filed July 6, 1939    6 Sheets-Sheet 1
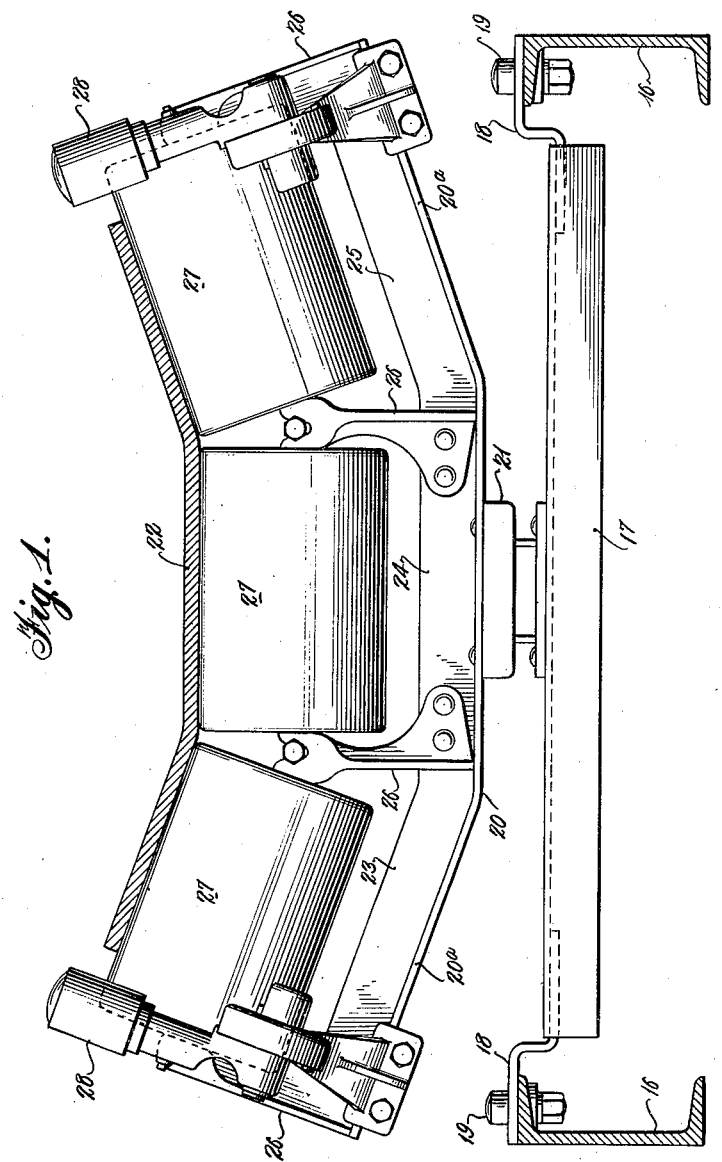
Inventor
Richard W. Parker
By [signature]
Attorney April 29, 1941. R. W. PARKER 2,239,687
SHOCK ABSORBER FOR BELT CONVEYER GUIDE AND ACTUATING ROLLS
Filed July 6, 1939 6 Sheets-Sheet 2
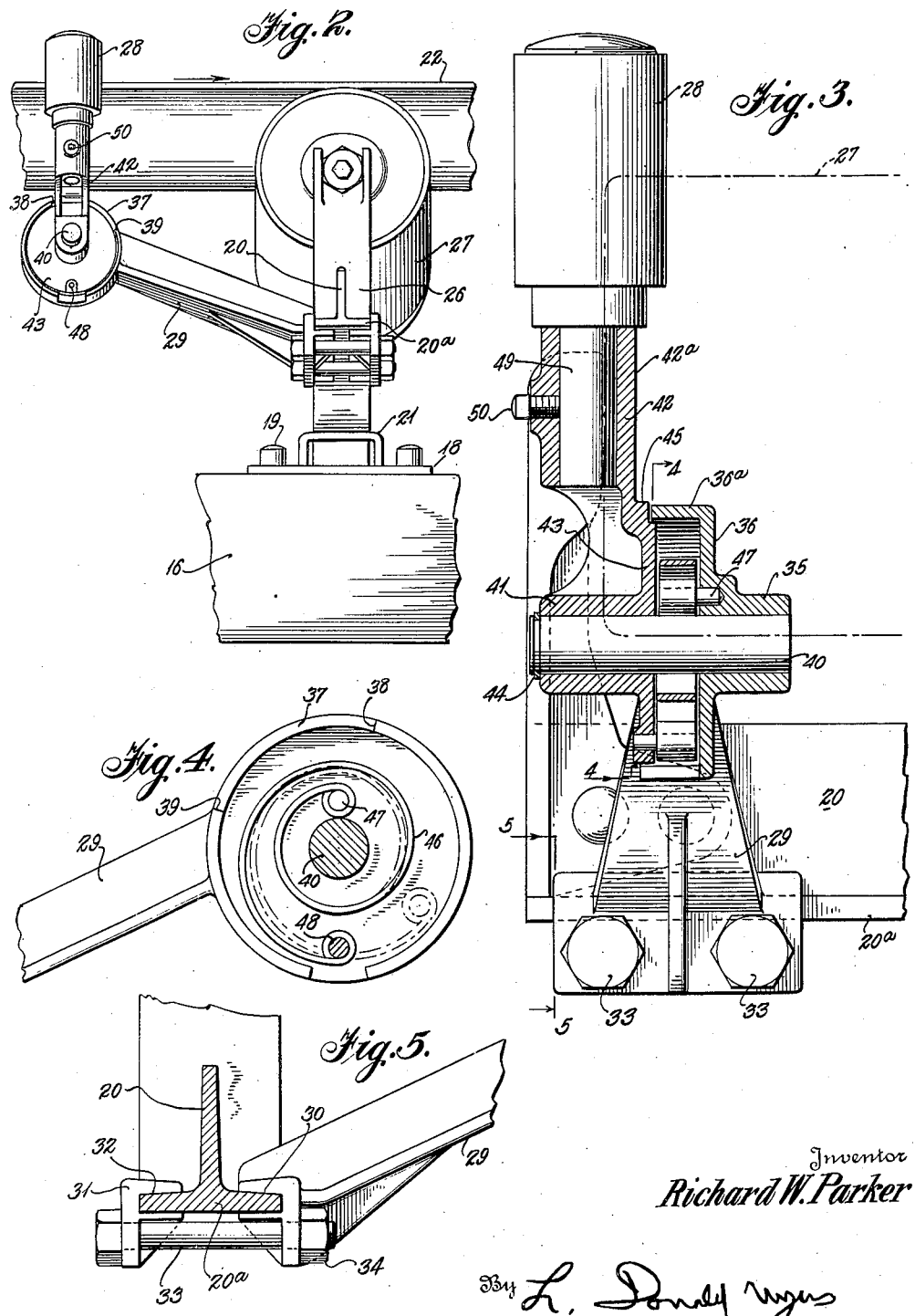
Inventor
Richard W. Parker
By L. Donald Myers
Attorney

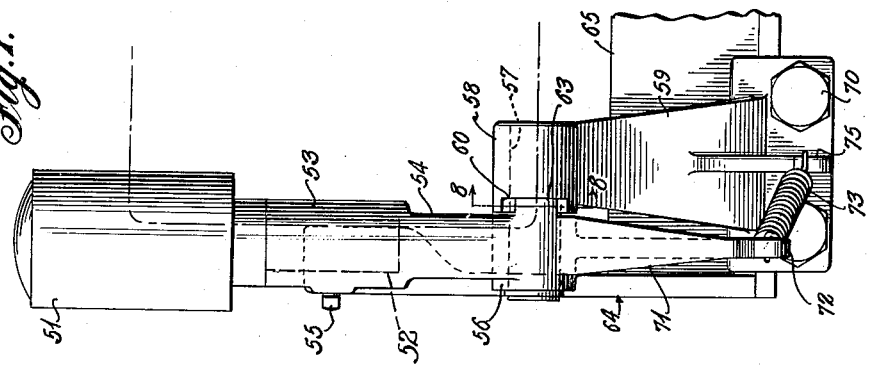
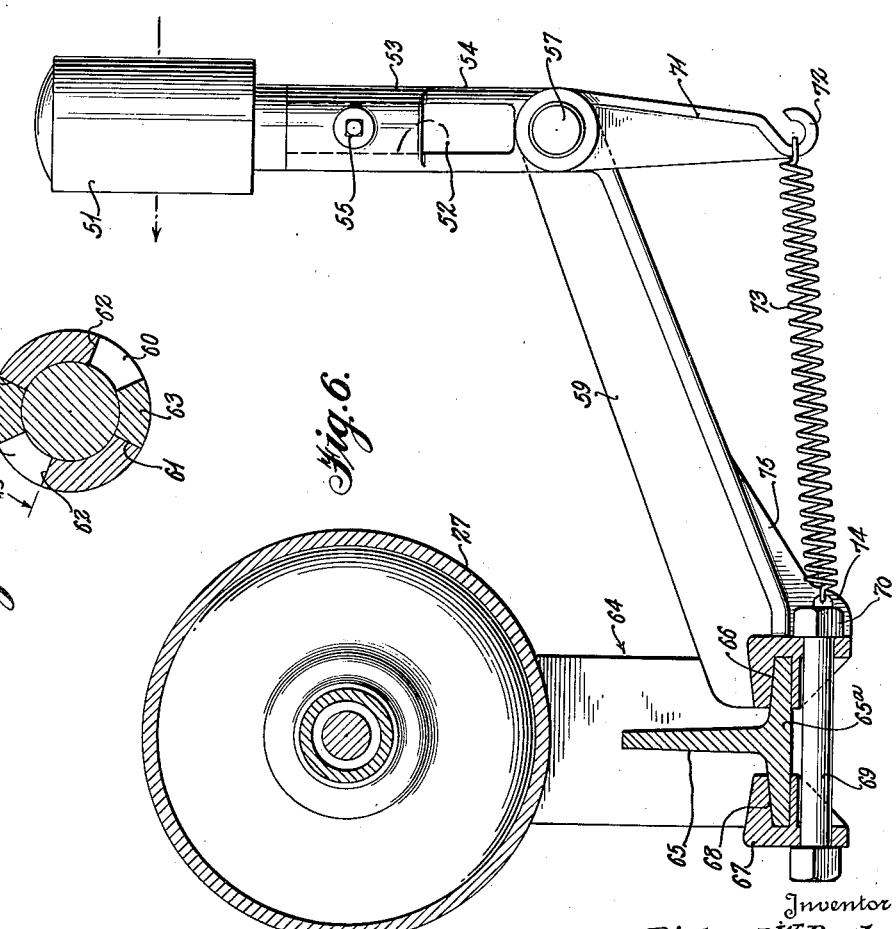

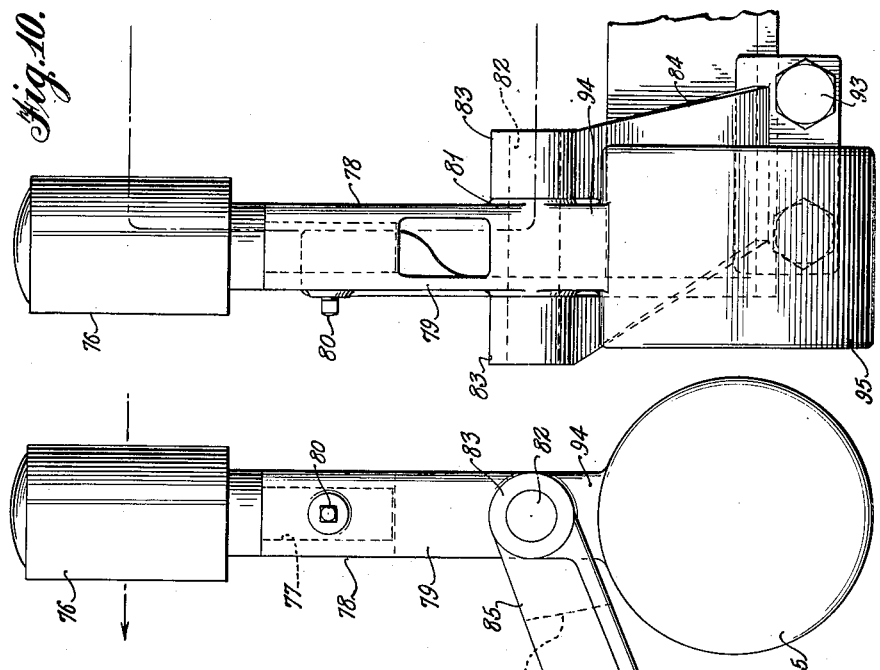
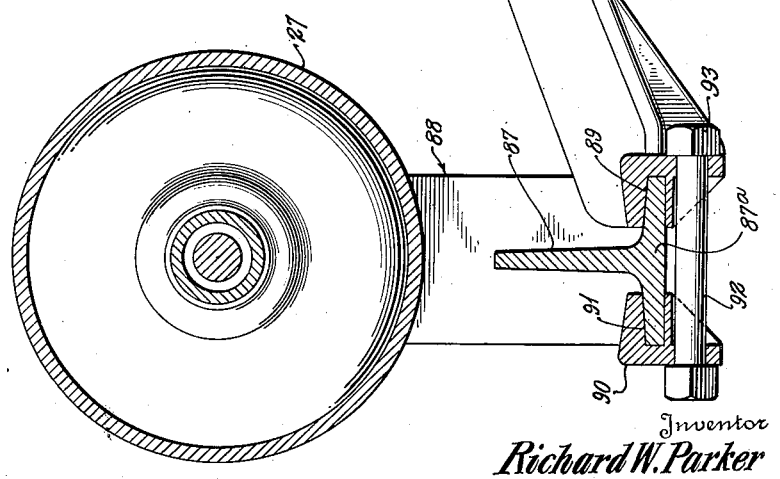

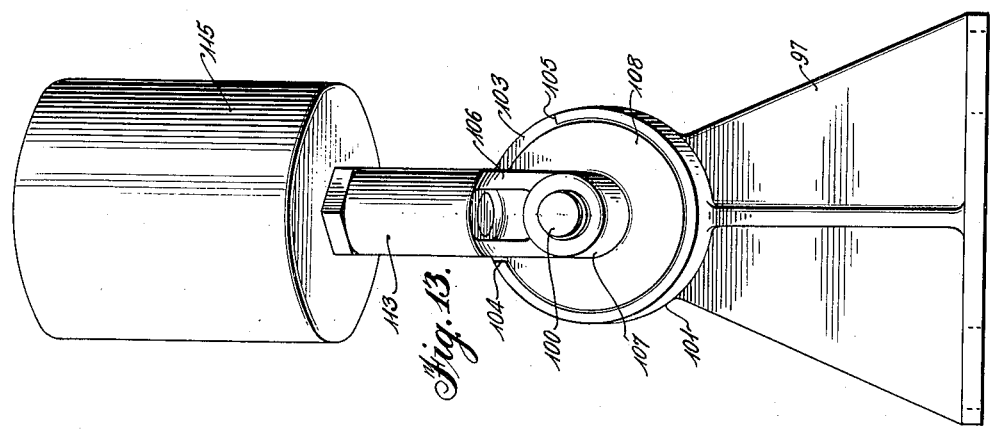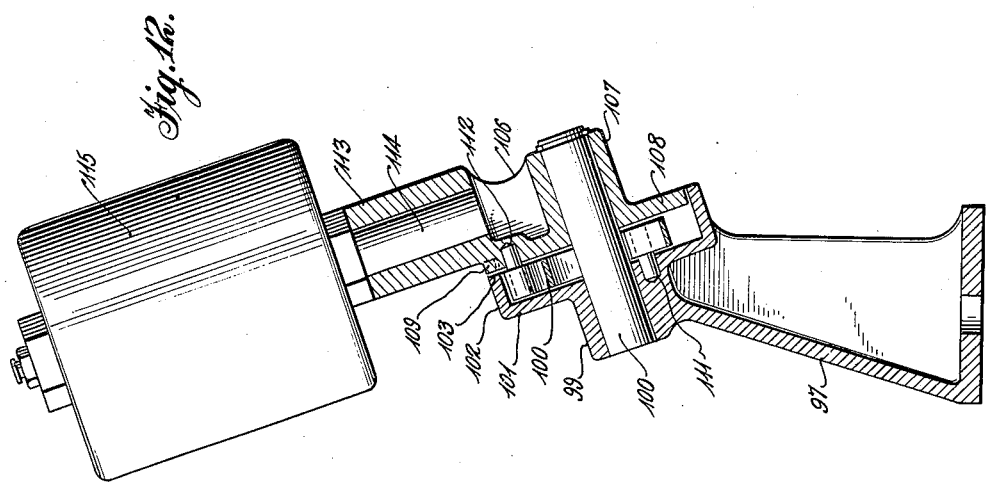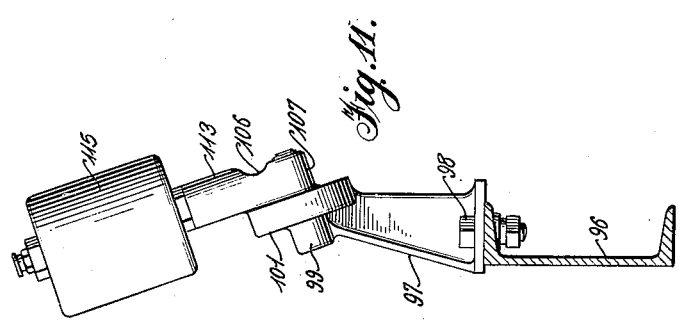

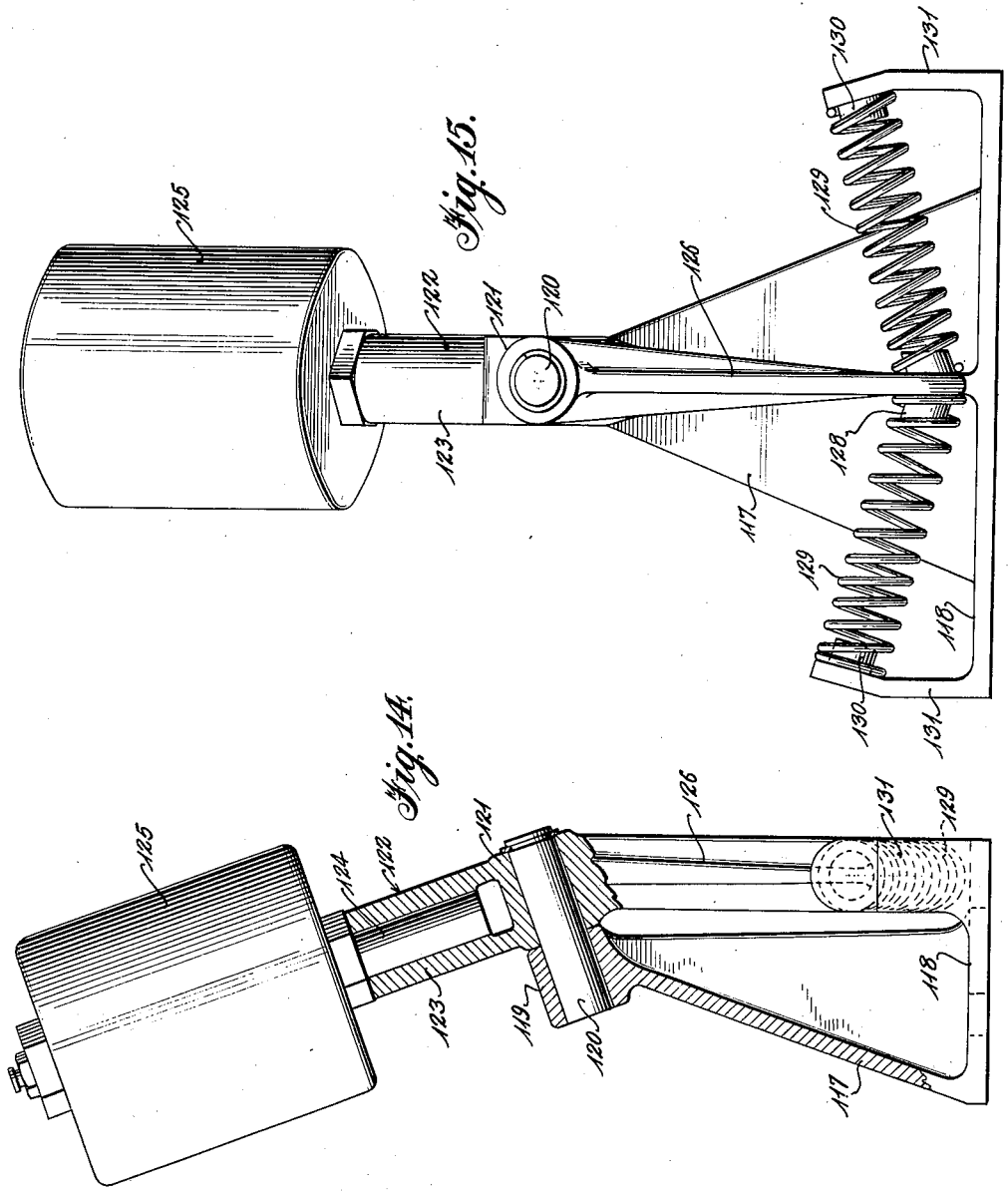

Patented Apr. 29, 1941

2,239,687

UNITED STATES PATENT OFFICE 2,239,687

SHOCK ABSORBER FOR BELT CONVEYER GUIDE AND ACTUATING ROLLS

Richard W. Parker, Indianapolis, Ind., assignor to Link-Belt Company, a corporation of Illinois Application July 6, 1939, Serial No. 283,078

19 Claims. (Cl. 198—202)

This invention relates to belt conveyers and deals more specifically with mounts for the guide and actuating rolls of fixed and self-aligning idlers.

In belt conveyers, the upper and lower runs of the belt are supported by idlers which are arranged at appropriate intervals along the stringers of the conveyer frame. The upper runs of the belt may be supported by the rolls of the idlers so as to provide either flat or troughed conveying surfaces, depending upon the type of materials or objects to be conveyed thereby. The lower or return runs are conventionally flatly supported by the idler rolls.

Because of improper mounting of the end pulleys or the supporting idlers, uneven transverse loading of the belts, uneven stretching and shrinking of the respective side edge portions of the belts, and the like, it is impossible to keep conveyer belts running absolutely true or in perfect alignment without resorting to some means for restraining or guiding the belts. Frequently it becomes advisable to employ means for automatically re-aligning mis-aligned belts.

Belts may be readily guided or restrained by upstanding guide rolls which are engaged by the longitudinal edges of conveyer belts when they become mis-aligned. Such guide rolls rigidly oppose excessive mis-alignment of the belts. Automatic re-alignment of the belts is accomplished with what are termed self-aligning idlers; i. e., idlers having carrying roll supporting frames which are mounted for swiveling movement about generally vertically arranged axes so that the belt supporting idler may assume positions with respect to the direction of travel of the belts which will bring about retrainment or re-alignment of the belts. Certain types of self-aligning idlers employ upstanding actuating rolls which are engaged by the longitudinal edges of the belts, upon mis-alignment of the latter, and the lateral force applied to the actuating rolls by the belts is employed for effecting the aforementioned retraining or re-aligning swiveling movement of the idler frames.

The upstanding guide and actuating rolls previously referred to generally are supported on suitable brackets, or the like, for rotation about axes which are normal to the top surfaces of the belts. These rolls are mounted for free rotation on pins or shafts carried by their brackets. It will be appreciated that the force applied to the guide and actuating rolls by the edges of the belts, due to mis-alignment, will be approximately radial of the rolls, while the force applied as a result of travel of the belts past the rolls will be tangential of the roll peripheries. Under normal conditions, therefore, the guide and actuating rolls will rotate freely and at a peripheral speed which is approximately equal to the speed of travel of the belt. For that reason, the rolls will not drag on or rub the belt edges and will not unduly wear the same.

It has generally been the custom in the past to mount the actuating rolls on the idler roll frame and the guide rolls on the stringers supporting the idlers by means of rigid, non-yielding brackets. This manner of mounting the rolls frequently is directly responsible for damage to the guide and actuating rolls and their mounts, as well as for undue wear on the belt edges.

When belt conveyers are called upon to handle materials, such as ore, which contain a certain percentage of medium or large lumps, it is not unusual for the lumps to overhang or project beyond the edges of the conveying belts as they travel past the actuating or guide rolls. Because of the not infrequent rapid speed of travel of the belts and the weight of the lumps of material, these overhanging lumps are capable of delivering hard blows which, when applied to a guide or actuating roll, will often damage them or their roll mounting brackets. Frequently the pin or shaft for a roll is bent by the blow with the result that the roll is not free to rotate, causing undue wear on the belt edge. The mounting bracket also may be damaged.

It is the primary object of this invention to mount the upstanding guide and actuating rolls in such a manner as to permit them to yield bodily in the direction of travel of the conveyer belt but to firmly resist any lateral force exerted by the belt against them.

A further important object of the invention is to provide means for limiting the yielding movements of the rolls in the direction of travel of the belt and to automatically return the rolls to their normal operating positions after removal of the force which has brought about the yielding movement. It will be appreciated that any roll mount which will make possible the accomplishment of the above noted objects will in no way alter the normal function of the guide or actuating roll. However, if the roll is struck a blow by material projecting beyond the belt edge, the roll will quickly and easily recede or yield without damage to the roll or any of its associated parts. After the projecting material has passed, the roll will return to its normal position in readiness to assume its intended function.

Other objects and advantages of the invention will be apparent during the course of the following description.

In the accompanying drawings forming a part of this specification in which like numerals are employed to designate like parts throughout the same, Figure 1 is a side elevational view of a complete idler of the self-aligning type with one form of actuating roll mount embodying this invention properly associated therewith, Figure 2 is an end elevational view of the self-aligning idler and actuating roll assembly illustrated in Fig. 1, Fig. 3 is a detail front elevational view, partly in section, of the form of actuating roll mount disclosed in Figs. 1 and 2, Figure 4 is a detail vertical sectional view taken on line 4—4 of Fig. 3, Figure 5 is a detail vertical sectional view taken on line 5—5 of Fig. 3, Figure 6 is a side elevational view of a modified form of roll mount embodying this invention, Figure 7 is a front elevational view of the modification disclosed in Fig. 6, Figure 8 is a detail vertical sectional view taken on line 8—8 of Fig. 7, Figure 9 is a side elevational view of a further modified form of roll mount, Figure 10 is a front elevational view of the roll mount disclosed in Fig. 9, Figure 11 is a front elevational view of a still further modified form of roll mount, Figure 12 is an enlarged view, partly in vertical section and partly in front elevation, of the roll mount disclosed in Fig. 11, Figure 13 is a side elevational view of the modified form of roll mount disclosed in Figs. 11 and 12, Figure 14 is a partly vertical sectional view and partly front elevational view of a still further modified form of roll mount embodying this invention, and Figure 15 is a side elevational view of the roll mount disclosed in Fig. 14.

In the drawings, wherein for the purpose of illustration are shown the preferred embodiments of this invention, and particularly referring to Figs. 1 to 5, inclusive, the reference character 16 designates the two longitudinally extending stringers which form a part of a belt conveyer frame. Extending transversely of the conveyer frame, between the stringers 16, is a channel base 17 having attached to its opposite ends, such as by welding, the angular attaching brackets 18. These attaching brackets have portions adapted to rest on the top flanges of the stringers 16 and to be secured thereto by bolt and nut attaching devices 19.

Mounted to swivel about a generally vertically arranged axis is a self-aligning idler which includes the inverted, T-sectional idler frame 20. A swivel joint 21, the details of which form no part of this invention, functions to attach the idler frame 20 to the central portion of the channel base 17. This self-aligning idler is designed to trough the belt 22, and for that reason the three sections 23, 24, and 25 of the idler frame are angularly arranged with respect to each other. These sections have suitably secured thereto the upstanding arms 26 which support the shafts for the idler rolls 27. The said rolls, as is clearly illustrated in Fig. 1, are angularly arranged to trough the belt 22.

In the type of self-aligning idler disclosed best in Figs. 1 and 2, the idler frame 20 with its angularly arranged belt supporting rolls 27 is caused to swivel, so as to re-align the belt 22 when it becomes mis-aligned, by upstanding actuating rolls 28. Fig. 2 discloses the position of these actuating rolls 28 relative to the idler frame 20. The actuating rolls 28 are arranged in an offset relation with respect to the idler frame 20 and on the approach side of the idler, i. e., on the side from which the belt 22 approaches the idler as indicated by the directional arrow in this Fig. 2.

To support the actuating rolls 28 in this offset relation with respect to the idler frame, a mounting bracket base member 29 is provided for each actuating roll and is detachably clamped to the base flange 20a of the inverted T-sectioned idler frame 20. To accomplish this detachable connection between the bracket base 29 and the idler frame 20, the bracket base is provided at its inner end with a groove 30 which is shaped to receive one flanged side portion of the idler frame. A separate lug 31 is provided and is similarly grooved at 32 to receive the remaining side flange portion of the idler frame 20. A plurality of bolts 33 with nuts 34 are provided for tightly drawing toward each other the lug 31 and the grooved inner end of the bracket base 29. This drawing together of these two parts very securely clamps the bracket base to the idler frame.

The outer or upper end of the bracket base 29 is shaped to provide a hub portion 35 with a concentrically arranged spring drum 36 integrally formed therewith. As is clearly illustrated in Figs. 2, 3, and 4, the peripheral flange 36a of the spring drum 36 is notched or cut away at 37 to provide the stop shoulders 38 and 39.

A swivel pin 40 is secured within the hub 35 of the bracket base 29. Journaled on the projecting end of this swivel pin 40 is the hub 41 of a bracket arm 42. This bracket arm and hub assembly has integrally formed thereon a disc-like plate portion 43 which is arranged to close the open side of the spring drum 36. A split retaining ring 44 is seated in a groove formed in the extremity of the swivel pin 40 for retaining the hub 41 of the bracket arm on said pin and for holding the disc plate 43 in position to close the open side of the spring drum 36. The upper peripheral portion of the disc-like plate 43 is provided with a lug 45 which occupies the notch or recess 37 formed in the peripheral flange 36a of the spring drum 36. This lug 45 cooperates with the stop shoulder 38 to determine the normal operative position of the bracket arm 42. The lug 45 cooperates with the stop shoulder 39 for limiting pivotal movement of the bracket arm 42 in the direction of travel of the belt 22.

To yieldably resist pivotal movement of the bracket arm 42 relative to the bracket base 29, a coil spring 46 is arranged within the spring drum 36 and has one end connected to the spring drum, in the region of the hub 35, by means of the pin 47. The remaining, outer end of the coil spring 46 is connected to the disc-like cover plate 43 by means of a pin 48. It will be appreciated that when the bracket arm 42 is moved in the direction of travel of the belt 22, so that its lug 45 moves out of engagement with the stop shoulder 38 and toward or into engagement with the stop shoulder 39, the coil spring 46 will be tightened or tensioned. The coil spring, therefore, will return the bracket arm 42 to its normal position when the force has been removed from the bracket arm 42.

To mount the actuating roll 28 on the bracket arm 42, the upper portion of this arm is of hollow construction, as at 42a, and this hollow or tubular portion receives the mounting pin or shaft 49 which rotatably supports the actuating roll 28. A set screw 50 is threaded in the side of the tubular portion 42a on the bracket arm and functions to lock the pin or shaft 49 against rotation.

When the conveyer belt 22 moves out of alignment, or axially of its supporting rolls 27, the edge of the belt will contact the actuating roll 28 on the side of the idler to which the belt has moved. The lateral force applied to the actuating roll 28 by the edge of the belt 22 will be applied to the idler frame 20, and this force will be multiplied by the lever action of the bracket base 29. The idler frame 20, therefore, will be caused to swivel about its mounting 21 and the supporting rolls 27 will be moved into an angular position with respect to the direction of travel of the conveyer belt 22. This angular arrangement of the supporting rolls 27 will cause the belt 22 to travel down or laterally into proper aligned position with respect to the remaining idlers, not shown, employed for supporting the remainder of the top run of the conveyer belt.

This re-aligned belt, therefore, will move away from the actuating roll 28 which it contacted as a result of its mis-alignment, and the load on the belt will cause the idler to assume its normal position where it extends truly transversely of the direction of travel or path or the conveyer belt.

As has been stated heretofore, if the conveyer belt 22 is handling material, such as ore, which contains medium or large lumps, it frequently happens that certain of the lumps will project beyond or overhang the side edges of the belt. As the actuating rolls 28 are rather closely positioned to the side edges of the belt, such overhanging lump material will invariably strike the actuating rolls. If the actuating rolls are supported by non-yielding brackets, the rolls will receive severe blows or shocks when struck by the projecting lumps of material.

With the actuating roll mounting structure disclosed in Figs. 1 to 5, inclusive, the roll is permitted to yield in the direction of travel of the belt 22, and the overhanging lump of material, and the blow delivered against the actuating roll by the projecting lump of material will in no way damage the roll or any of its mounting parts. After the projecting lump has passed over the actuating roll 28, the coil spring 46 will return the actuating roll, and its supporting bracket arm 42, to their normal operative position in readiness for performing their intended function when the edge of the conveyer belt 22 again contacts the actuating roll.

Figs. 6 to 8, inclusive, disclose a modified form of mount for actuating rolls. In this modification, the actuating roll 51 is rotatably supported by a pin or shaft 52 received within the hollow or tubular portion 53 of a bracket arm 54. A set screw 55 is employed for preventing rotation of the pin or shaft 52.

The bracket arm 54 is provided with a hub portion 56 that is journaled on the pivot pin 57. This pin is secured within the hub portion 58 of the bracket base 59. The hub 58 is notched or recessed at 60, see Figs. 7 and 8, so as to provide two pairs or sets of stop shoulders 61 and 62. The hub 56 of the bracket arm 54 is provided with a pair of lugs 63 which are arranged to be received within the notches or recesses 60 of the hub 58. Fig. 8 discloses the lugs 63 in engagement with the stop shoulders 61. The lugs assume these positions when the bracket arm 54 is in its normal operative position. The lugs 63 move toward or into engagement with the remaining shoulders 62 when the actuating roll 51 and its bracket arm 52 are pivoted relative to the pin or shaft 57 in the direction of travel of the belt, or toward the associated idler designated in its entirety by the reference character 64.

To mount the bracket base 59 on the idler frame 65, the inner or lower end of the bracket base is notched at 66 to receive one side flange portion of the head 65a of the inverted T-sectioned idler frame 65. A separate lug 67 is notched at 68 to receive the remaining side flange portion of the head 65a. Bolts 69 pass through the lower end portion of the bracket base 59 and the lug 67 and by means of the nuts 70 draw the lug 67 and the lower end of the bracket base 59 toward each other to securely clamp the bracket base to the idler frame.

For the purpose of yieldably resisting movement of the actuating roll 51 in the direction of travel of the belt and for returning the actuating roll 51 to its normal position after it has been moved therefrom, the bracket arm 54 is provided with an auxiliary arm 71 which depends below the pivot pin 57 on which the bracket arm is mounted. The lower extremity of this auxiliary arm 71 is hook shaped, as at 72, for connection with one end of a tension spring 73. The remaining end of this spring passes through an aperture 74 formed in a reinforcing web 75 provided at the lower end of the bracket base 59. When the actuating roll 51 and its bracket arm 54 are moved in the direction of travel of the belt, as a result of the actuating roll being struck by an object projecting beyond the adjacent edge of the conveyer belt, the spring 73 will be stretched or tensioned to a greater extent than normal. When the force which has caused the pivotal movement of the actuating roll 51 has been removed, the spring 73 will return the actuating roll and its bracket arm 54 to their normal position.

Figs. 9 and 10 disclose a still further modified form of roll mount. The actuating roll 76 of this assembly is rotatably supported by a shaft or pin 77 which is secured within the hollow or tubular portion 78 of a bracket arm 79 by means of a set screw 80. This bracket arm is provided with a hub portion 81 which is journaled on a pivot pin or shaft 82 that is supported in the hub portions 83 of a bracket base 84. The hub portions 83 of the bracket base are spaced, as clearly illustrated in Fig. 10, as a result of bifurcating the outer or upper end portion 85 of the bracket base 84. The dotted line 86 in Fig. 9 represents the crotch or bottom of this bifurcated end 85.

The lower end of the bracket base 84 is secured to the frame 87 of an idler, designated in its entirety by the reference character 88. The means for securing the bracket base 84 to the idler frame 87 is the same as that which has been disclosed and described in connection with the modifications shown best in Figs. 1, 5, and 6 and includes a notch 89 at the lower end of the bracket base 84 which receives one side flange portion of the head 87a of the T-sectioned idler frame 87. A separate lug 90 is notched at 91 to receive the remaining side flange portion of the idler frame head 87a. Clamping bolts 92 pass through the lug 90 and the lower end portion of the bracket base 84 and have nuts 93 which may be turned down on the bolts 92 for securely clamping the bracket base to the idler frame by drawing the lug 90 toward the notched or grooved lower end portion of the bracket base.

The actuating roll 76 with its supporting bracket arm 79 are intended to yieldably pivot or move in the direction of travel of the belt or toward the idler roll 27. This pivotal movement is limited by engagement of the bracket arm 79 with the crotch or bottom 86 of the bifurcated end 85 formed on the bracket base 84. For the purpose of yieldably resisting this pivotal movement of the actuating roll 76 and for automatically returning the roll and its bracket arm to their normal operative positions, a depending extension or auxiliary arm 94 is formed on the bracket arm 79 and is arranged below the pivot pin 82. Mounted on this extension or auxiliary arm 94 is a counterweight 95. This weight is heavy enough to quickly and easily return the actuating roll 76 to its normal position where it will be engaged by the edge of a belt running over the idler roll 27.

Figs. 1 to 10, inclusive, disclose mounts for actuating rolls which are employed in connection with self-aligning idlers. These idlers may be of the type shown in Fig. 1 which is intended to trough the upper run of the belt. It will be understood, however, that the actuating rolls of these various figures may be employed in the same way in connection with self-aligning idlers which are designed to flatly support the run of the conveyer belt. Also, the bracket bases of these several roll mounts may be clamped to the head flanges of fixed or stationary idler frames regardless of whether these fixed or stationary idler frames are designed for flatly supporting a belt run or for troughing a belt run.

In Figs. 11 to 15, inclusive, there are shown mounts for guide rolls which make possible the supporting of the roll mounts on the stringers of belt conveyer frames as distinguished from supporting the roll mounts on idler frames. Figs. 11 to 13, inclusive, disclose the supporting of a guide roll on a belt conveyer stringer by means of the same type of mount illustrated in Figs. 1 to 5, inclusive. Figs. 14 and 15 disclose a different type of mount from any heretofore described with this type of mount intended to be supported on a belt conveyer stringer. It is to be understood, however, that the mounts for the rolls disclosed in Figs. 6 to 10, inclusive, can be adapted for being supported on conveyer frame stringers in the same manner as Figs. 11 to 13, inclusive, illustrate the supporting of the mount of Figs. 1 to 5, inclusive, on conveyer frame stringers. It, also, is to be understood that the type of mount shown in Figs. 14 and 15 is just as readily adaptable to use with self-aligning idlers as are the mounts of Figs. 1 to 10, inclusive.

Referring now specifically to the disclosure of Figs. 11 to 13, inclusive, the reference character 96 designates a stringer of a belt conveyer frame. A bracket base 97 is supported on the top flange of the stringer 96 and is secured thereto by bolt and nut fastening devices 98. The upper end of the bracket base 97 has formed thereon a hub 99 for receiving a pivot pin or shaft 100. Concentric with the hub 99 is a spring drum 101. As is shown in Fig. 12, the flange 102 of this spring drum is recessed at 103 to provide, as is shown in Fig. 13, the stop shoulders 104 and 105.

A bracket arm 106 is provided with a hub portion 107 that is rotatably journaled on the projecting end of the pivot pin or shaft 100. The bracket arm and hub 106 and 107, respectively, have formed thereon a disc-like cover plate 108 for the spring drum 101. This cover plate has an offset 109 which is received within the recess 103 of the drum flange 102 and cooperates with the stop shoulders 104 and 105 to determine the opposite limits to which the bracket arm 106 may pivot with respect to the supporting pin or shaft 100.

To yieldably resist pivotal movement of the arm 106 and to automatically return this arm to its normal position, a coil spring 110 is positioned within the spring drum 101 and has its opposite ends connected to the bracket base 97 and the bracket arm 106 by pins 111 and 112, respectively.

The upper portion of the bracket arm 106 is of hollow or tubular construction, as at 113, for receiving the shaft or pin 114 which rotatably supports the guide roll 115.

It will be appreciated that when the conveyer belt 116 moves laterally in the direction of the guide roll 115, this guide roll will positively resist further lateral movement of the belt. Mis-alignment of the belt, therefore, will be limited by the guide roll 115. However, if the guide roll is struck by any lump or object overhanging the edge of the belt, the guide roll will be permitted to yield in the direction of travel of the belt and the guide roll with its associated elements will not be damaged in any way. After the object or lump has passed over the guide roll 115, the coil spring 110 will return the roll and its bracket arm 106 to their normal position.

In Figs. 14 and 15, there is disclosed a bracket base 117 which is particularly designed for being supported on the top flange of a stringer of a belt conveyer frame by means of the flange 118. The upper end of the bracket base 117 is provided with a hub 119 in which is secured the end portion of a shaft or pin 120. The projecting end portion of this shaft or pin 120 has journaled thereon the hub portion 121 of a bracket arm 122. This bracket arm is provided with a hollow or tubular portion 123 for receiving the pin or shaft 124 which rotatably supports the guide roll 125.

The bracket arm 122 has formed thereon a depending auxiliary arm 126 which terminates at its lower extremity in rather close proximity to the mounting flange 118 of the bracket base 117. This extremity of the auxiliary arm 126 has oppositely projecting bosses 128 formed thereon. These bosses are intended to fit within the adjacent ends of compression springs 129. The outer ends of these compression springs receive bosses 130 formed on upstanding lugs or ears 131 which are carried by the opposite sides of the bracket base mounting flange 118.

This guide roll mount is of a type which will permit the guide roll to yield in either one of two directions and is suitable for use with the run of a conveyer belt which is intended to travel in either direction. The compression springs 129 will return the guide roll 125 and its bracket arm 122 to their normal positions regardless of the direction in which the guide roll has been pivoted. The springs 129 also will limit pivotal movements of the guide roll 125 in both directions as a result of closing up of the spaces between the convolutions of the springs.

It is noted that the guide rolls 115 and 125 of Figs. 11 to 15, inclusive, are arranged so that their axes of rotation do not extend truly perpendicularly. These guide rolls, therefore, are positioned for cooperation with the edges of troughed conveyer belts. By merely reshaping the necessary portions of the bracket bases and bracket arms of these roll mounts so that the pivot pins or shafts 100 and 120 will extend truly horizontally, the guide rolls 115 and 125 may be arranged to rotate about truly perpendicular axes. The guide rolls then would be positioned for proper cooperation with the edges of flatly supported conveyer belt runs.

It further will be understood that the various modifications of this invention may be employed for guiding or re-aligning either the upper or lower runs of conveyer belts.

As has been rather specifically explained above, it is to be understood that the forms of this invention herewith shown and described are to be taken as preferred examples of the same, and that various changes in the shape, size, and arrangement of parts may be resorted to without departing from the spirit of the invention or the scope of the sub-joined claims.

Having thus described the invention, I claim:

1. In a belt conveyer, the combination with the belt of the conveyer of a roll positioned to be engaged by an edge of the belt when the belt becomes unduly misaligned, a bracket arm rotatably supporting the roll, a bracket base, means for mounting the bracket base on a part of the belt conveyer, and means for attaching the bracket arm to the bracket base to permit the arm to partake of yieldably resisted pivotal movements from its normal position only about an axis which is parallel to the top surface of the adjacent portion of the belt and is normal to the direction of travel of the belt when the roll is engaged by an object conveyed by the belt.

2. In a belt conveyer, the combination with the belt of the conveyer of a roll positioned to be engaged by an edge of the belt when the belt becomes unduly mis-aligned, a bracket arm rotatably supporting the roll, a bracket base, means for mounting the bracket base on a part of the belt conveyer, means for attaching the bracket arm to the bracket base to permit the arm to pivot from its normal position only in the general direction of travel of the belt, and means for yieldably resisting such pivotal movement of the bracket arm and for returning the arm to its normal position after such movement.

3. In a belt conveyer, the combination with the belt of the conveyer of a roll positioned to be engaged by an edge of the belt when the belt becomes unduly mis-aligned, means for rotatably supporting the roll including a bracket arm, a bracket base, means for mounting the bracket base on a part of the belt conveyer, means for attaching the bracket arm to the bracket base to permit the arm to pivot from its normal position only in the general direction of travel of the belt, means associated with the bracket arm for limiting such pivotal movement, and means for yieldably resisting such pivotal movement of the bracket arm and for returning the arm to its normal position after such movement.

4. In a belt conveyer, the combination with the belt of the conveyer of a roll positioned to be engaged by an edge of the belt when the belt becomes unduly misaligned, a bracket arm rotatably supporting the roll, a bracket base, means for mounting the bracket base on a part of the belt conveyer, means for attaching the bracket arm to the bracket base to permit the arm to pivot from its normal position only in the general direction of travel of the belt, and spring means for yieldably resisting such pivotal movement of the bracket arm and for returning the arm to its normal position after such movement.

5. In a belt conveyer, the combination with the belt of the conveyer of a roll positioned to be engaged by an edge of the belt when the belt becomes unduly misaligned, a bracket arm supporting the roll, a bracket base, means for mounting the bracket base on a part of the belt conveyer, means for attaching the bracket arm to the bracket base to permit the arm to pivot from its normal position only in the general direction of travel of the belt, means associated with the bracket arm for limiting such pivotal movement, and spring means for yieldably resisting such pivotal movement of the bracket arm and for returning the arm to its normal position after such movement.

6. In a belt conveyer, the combination with the belt of the conveyer of a roll positioned to be engaged by an edge of the belt when the belt becomes unduly misaligned, a bracket arm rotatably supporting the roll, a bracket base, means for mounting the bracket base on the frame of an idler for the conveyer, and means for attaching the bracket arm to the bracket base to permit the arm to pivot from its normal position only in the general direction of travel of the belt.

7. In a belt conveyer, the combination with the belt of the conveyer of a roll positioned to be engaged by an edge of the belt when the belt becomes unduly misaligned, a shaft for supporting the roll, a bracket arm connected to the shaft, a bracket base, said bracket arm and bracket base each having a hub portion, a shaft received in the hub portions of said arm and base to pivotally attach the arm to the base for movement in the general direction of travel of the belt, means associated with the arm and base for limiting such pivotal movement, means for returning the arm to its normal position after pivotal movement, and means for mounting the bracket base on a part of the belt conveyer.

8. In a belt conveyer, the combination with the belt of the conveyer, of a roll positioned to be engaged by an edge of the belt when the belt becomes unduly misaligned, a bracket arm rotatably supporting the roll, a bracket base, said bracket arm and bracket base each having a hub portion, a shaft received in said hub portions to pivotally attach the arm to the base for movement in the general direction of travel of the belt, a coil spring, means for attaching the opposite ends of said spring to the bracket arm and the bracket base to cause the spring to yieldably resist such pivotal movement of the bracket arm and to cause the arm to be returned to its normal position after such movement, and means for mounting the bracket base on a part of the belt conveyer.

9. In a belt conveyer, the combination with the belt of the conveyer, of a roll positioned to be engaged by an edge of the belt when the belt becomes unduly misaligned, a bracket arm rotatably supporting the roll, a bracket base, said bracket arm and bracket base each having a hub portion, a shaft received in said hub portions to pivotally attach the arm to the base for movement in the general direction of travel of the belt, a coil spring, means associated with the said hubs for enclosing the coil spring, means for attaching the opposite ends of said spring to the bracket arm and the bracket base to cause the spring to yieldably resist such pivotal movement of the bracket arm and to cause the arm to be returned to its normal position after such movement, and means for mounting the bracket base on a part of the belt conveyer.

10. In a belt conveyer, the combination with the belt of the conveyer, of a roll positioned to be engaged by an edge of the belt when the belt becomes unduly misaligned, a bracket arm rotatably supporting the roll, a bracket base, said bracket arm and bracket base each having a hub portion, a shaft received in said hub portions to pivotally attach the arm to the base for movement in the general direction of travel of the belt, a coil spring, means associated with the said hubs for enclosing the coil spring, means associated with the spring enclosing means for limiting such pivotal movement, means for attaching the opposite ends of said spring to the bracket arm and the bracket base to cause the spring to yieldably resist such pivotal movement of the bracket arm and to cause the arm to be returned to its normal position after such movement, and means for mounting the bracket base on a part of the belt conveyer.

11. In a belt conveyer, the combination with the belt of the conveyer and a roll for supporting the belt, of a second roll positioned to be engaged by an edge of the belt when the belt becomes unduly misaligned, means for rotatably supporting the second roll for rotation about an axis which is normal to the axis of rotation of the belt supporting roll, means for mounting the second roll supporting means for pivotal movement in the general direction of travel of the belt about an axis which is normal to the axis of rotation of the second roll, and spring means for yieldably resisting such pivotal movement of the second roll support and for returning said support to its normal position after such movement.

12. In a belt conveyer, the combination with the belt of the conveyer and a roll for supporting the belt, of a second roll positioned to be engaged by an edge of the belt when the belt becomes unduly misaligned, means for rotatably supporting the second roll for rotation about an axis which is normal to the axis of rotation of the belt supporting roll, means for mounting the second roll supporting means for yieldably resisted pivotal movement in the general direction of travel of the belt about an axis which is normal to the axis of rotation of the second roll, and means for limiting the pivotal movement of the second roll supporting means.

13. In a belt conveyer, the combination with the belt of the conveyer, of a roll positioned to be engaged by an edge of the belt when the belt becomes unduly misaligned, means for rotatably supporting the roll, means for normally mounting said roll support so that it will pivot about an axis which is parallel to the top surface of the adjacent portion of the belt and is normal to the direction of travel of the belt when the roll is engaged by an object conveyed by the belt, and means for yieldably resisting such pivotal movement of said roll support and for returning the same to its normal position after the belt-conveyed object has passed beyond the location of the roll.

14. In a belt conveyer, the combination with the belt of the conveyer, of a roll positioned to be engaged by an edge of the belt when the belt becomes unduly misaligned, means for rotatably supporting the roll, means for normally mounting said roll support so that it will pivot about an axis which is parallel to the top surface of the adjacent portion of the belt and is normal to the direction of travel of the belt when the roll is engaged by an object conveyed by the belt, means for yieldably resisting such pivotal movement of said roll support and for returning the same to its normal position after the belt conveyed object has passed beyond the location of the roll, and means for limiting the pivotal movement of the roll support in response to engagement of the roll with a conveyed object and in being returned to its normal position.

15. In a belt conveyer, the combination with the belt of the conveyer, of a roll positioned to be engaged by an edge of the belt when the belt becomes unduly misaligned, means for rotatably supporting the roll, means for normally mounting said roll support so that it will pivot about an axis which is parallel to the top surface of the adjacent portion of the belt and is normal to the direction of travel of the belt when the roll is engaged by an object conveyed by the belt, said roll support mounting means also holding the roll support against movement in a direction laterally of the belt, and means for yieldably resisting such pivotal movement of said roll support and for returning the same to its normal position after the belt conveyed object has passed beyond the location of the roll.

16. In a belt conveyer, the combination with the belt of the conveyer and a roll for supporting the belt, of a second roll positioned to be engaged by an edge of the belt when the belt becomes unduly misaligned, means for rotatably supporting the second roll, and means for mounting the second roll support on an idler frame of the conveyer for yieldably resisted pivotal movement relative to the belt supporting roll about an axis which is parallel to the top surface of the adjacent portion of the belt but is normal to the direction of travel of the belt.

17. In a belt conveyer, the combination with an idler frame with its roll for supporting a belt and means for supporting the idler frame for pivotal movement about an axis which is normal to the path of travel of the belt to effect realignment of the belt, of a guide roll positioned to be engaged by the edge of the belt when the belt becomes unduly misaligned, means for rotatably supporting the guide roll, and means for mounting said guide roll support on the idler frame so that lateral pressure applied to the guide roll after engagement of the belt edge with the guide roll will cause the idler frame and guide roll to move together and the idler frame to assume a belt realigning position, said mounting means also including means for mounting said guide roll support for yieldably resisted pivotal movement relative to the idler frame about an axis which is parallel to the top surface of the adjacent portion of the belt but is normal to the direction of travel of the belt and without causing the idler frame to partake of belt re-aligning movement.

18. In a belt conveyer, the combination with a stationary part of the conveyer, of a roll positioned to be engaged by an edge of the belt when the belt becomes unduly misaligned to prevent further misaligning movement, means for normally supporting the roll for rotation about an axis which is at right angles to the top surface of the belt, and means for mounting the roll support on the aforesaid stationary part of the conveyer for yieldably resisted pivotal movement which will cause the roll to travel in an arcuate path which lies in a plane that parallels the edge of the belt and which may extend from the normal position of the roll to a point which will allow an object carried by the top surface of the belt and projecting beyond the edge thereof to pass over the roll.

19. In a belt conveyer, the combination with a stationary part of the conveyer, of a roll positioned to be engaged by an edge of the belt when the belt becomes unduly misaligned to prevent further misaligning movement, means for normally supporting the roll for rotation about an axis which is at right angles to the top surface of the belt, means for mounting the roll support on the aforesaid stationary part of the conveyer for yieldably resisted pivotal movement which will cause the roll to travel in an arcuate path which lies in a plane that parallels the edge of the belt and which may extend from the normal position of the roll to a point which will allow an object carried by the top surface of the belt and projecting beyond the edge thereof to pass over the roll, and means for limiting the movement of the roll support at the ends of said arcuate path.

RICHARD W. PARKER.